United States Patent
Lo et al.

(10) Patent No.: US 8,555,051 B2
(45) Date of Patent: Oct. 8, 2013

(54) COMPUTER FACILITATING BIOS SETTING

(75) Inventors: Chien-Hung Lo, Tu-Cheng (TW); Xiang Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 247 days.

(21) Appl. No.: 13/092,983

(22) Filed: Apr. 25, 2011

(65) Prior Publication Data

US 2012/0239919 A1 Sep. 20, 2012

(30) Foreign Application Priority Data

Mar. 16, 2011 (CN) .......................... 2011 1 0063072

(51) Int. Cl.
 *G06F 9/00* (2006.01)

(52) U.S. Cl.
 USPC .......................................................... 713/2

(58) Field of Classification Search
 USPC ...................................................... 713/1–2
 See application file for complete search history.

(56) References Cited

U.S. PATENT DOCUMENTS

| | | | | |
|---|---|---|---|---|
| 6,092,207 | A  * | 7/2000 | Kolinski et al. | 713/323 |
| 2004/0221147 | A1* | 11/2004 | Tseng et al. | 713/1 |
| 2007/0143518 | A1* | 6/2007 | Kim | 710/303 |
| 2009/0210690 | A1* | 8/2009 | Wu et al. | 713/2 |
| 2009/0256546 | A1* | 10/2009 | Wu et al. | 323/318 |
| 2010/0299560 | A1* | 11/2010 | Lin | 714/15 |

\* cited by examiner

*Primary Examiner* — Kim Huynh
*Assistant Examiner* — Alyaa T Mazyad
(74) *Attorney, Agent, or Firm* — Altis & Wispro Law Group, Inc.

(57) ABSTRACT

A computer includes a mother board, a standby power source, a BIOS display, and a BIOS user input. The mother board includes a storage unit. The storage unit stores BIOS software and BIOS settings of the computer. The standby power source is configured for providing a standby voltage when the computer is powered but not started up. The controller is configured for reading the BIOS software and the BIOS settings from the storage unit, driving the BIOS display to display a BIOS UI based upon the BIOS software and the BIOS setting, and editing the BIOS settings based upon inputs from the BIOS input unit upon the condition that the controller, the BIOS display, and the BIOS input unit receive the standby voltage.

12 Claims, 2 Drawing Sheets

COMPUTER FACILITATING BIOS SETTING

BACKGROUND

1. Technical Field

The present disclosure relates to computers and, particularly, to a computer providing a convenient way to access and interface a basic input output system (BIOS) user interface (UI) of the computer.

2. Description of Related Art

To configure computer hardware, people either need to access the BIOS UI initially at start-up of the computers or must restart the computers if the computers are already started up and the operating system is activated. This is inconvenient.

Therefore, it is desirable to provide a computer, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
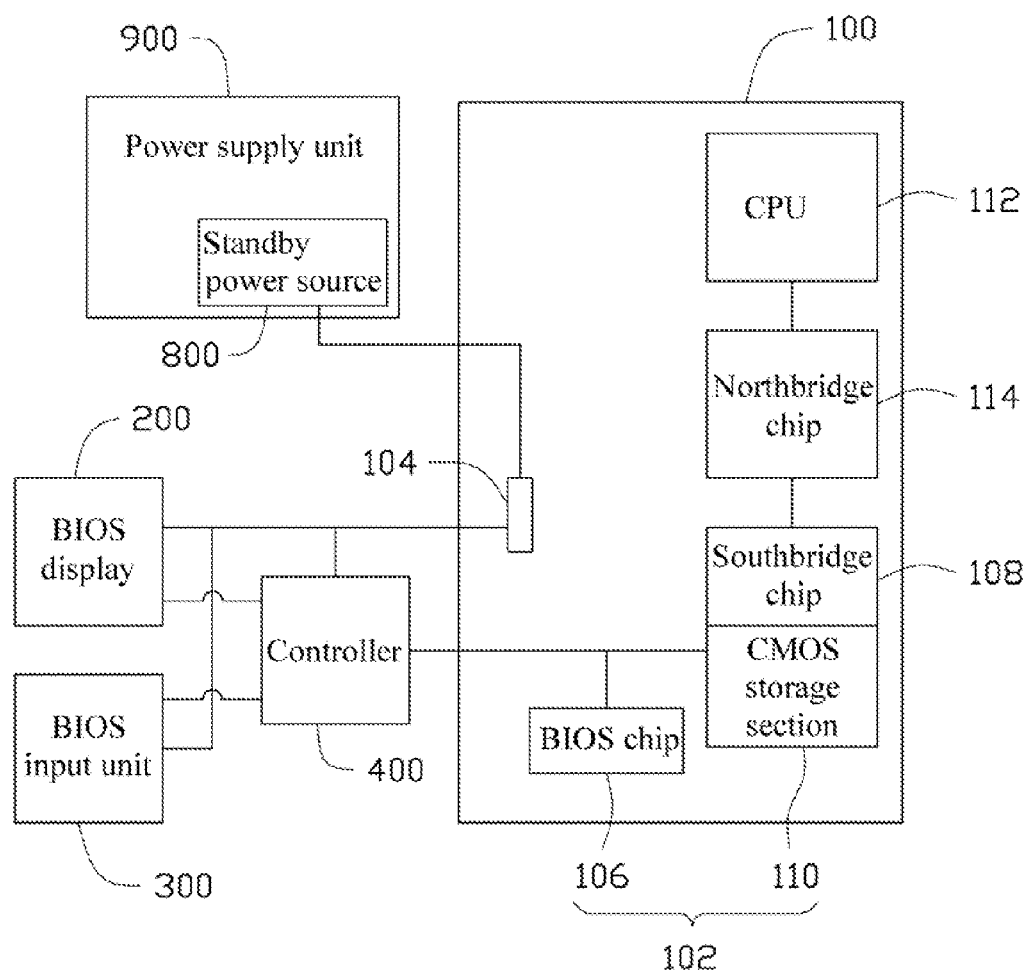
FIG. 1 is a functional block diagram of a computer, according to an embodiment.

Referring to FIG. 1, a computer 10, according to an embodiment, includes a mother board 100, a standby power source 800, a controller 400, a BIOS display 200, and a BIOS input unit 300. The mother board 100 includes a storage unit 102. The storage unit 102 stores BIOS software and BIOS settings of the computer 10. The standby power source 800 is configured for providing a standby voltage $V_{STB}$ (e.g., 5V, direct current) to the controller 400, the BIOS display 200, and the BIOS input unit 300 after the computer 10 is powered (i.e., the computer 10 is connected to/plugged into an external power source through a cable or a battery is attached to the computer 10) even before the computer 10 is started up/turned on (i.e., the computer 10 is activated). The controller 400 is configured for reading the BIOS software and the BIOS settings from the storage unit 102 and rendering a BIOS UI on the BIOS display 200 based upon the BIOS software and the BIOS settings after receiving the standby voltage $V_{STB}$. The controller 400 is also configured for editing the BIOS settings according to user input by the BIOS input unit 300 after receiving the standby voltage $V_{STB}$. The BIOS display 200 is configured for displaying the BIOS UI after receiving the standby voltage $V_{STB}$. The BIOS input unit 300 is configured for receiving user input after receiving the standby voltage $V_{STB}$.

Thus, if the computer 10 is plugged into a power source but not turned on, the BIOS UI can be directly accessed without starting the computer 10. Further, even if the compute 10 is on and an operating system is activated, the BIOS UI can still be accessed without restarting the computer 10. Once the BIOS UI has been accessed to change the BIOS settings of the computer 10, the computer 10 may need to be restarted for the new BIOS settings to be applied.

Figure 2:
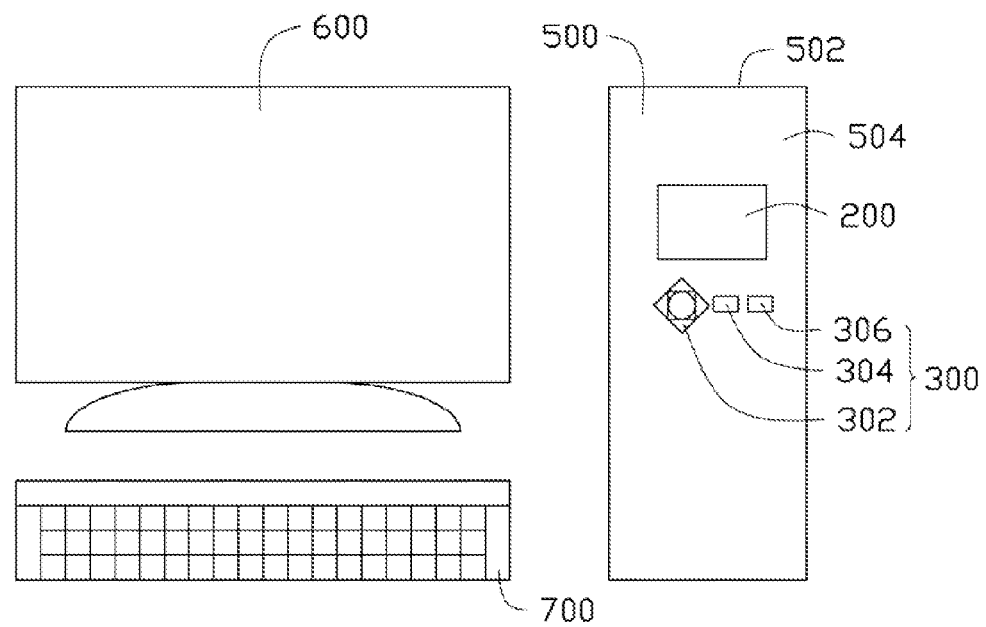
FIG. 2 is a schematic planar view of a computer system having the computer of FIG. 1

Also referring to FIG. 2, in this embodiment, the computer 10 is used in a desktop computer system 500 which, in addition to the computer 10, further includes a display device 600 and a keyboard 700. The computer 10 includes a housing 502. The housing 502 includes a front panel 504 which typically users will face when using the computer 10. The mother board 100 and the controller 400 are received in the housing 502, but are physically separated from each other. The BIOS display 200 and the BIOS input unit 300 are mounted in the front panel 504 to facilitate interaction between the users and the BIOS display 200 and the BIOS input unit 300. The computer 10 is configured for receiving, storing, processing, and sending information after the computer 10 is started up. The display device 600 is configured for displaying information from the computer 10 after the computer 10 is started up. The keyboard 700 is operable to send information to the computer 10 after the computer 10 is started.

In other embodiments, the computer 10 can be applied to a laptop computer or a server. The mother board 100, the BIOS display 200, the BIOS input unit 300, and the controller 400 can be configured in other arrangements depending on requirements. For example, the controller 400 can be directly disposed on the mother board 100. The BIOS display 200 and the BIOS input unit 300 can be mounted to other positions of the housing 502, or mounted to the display device 600 or other devices where people can conveniently view the BIOS display 200 and operate the BIOS input unit 300.

The mother board 100 includes a BIOS chip 106 and a southbridge chip 108. The BIOS software is stored in the BIOS chip 106. The southbridge chip 108 includes a complementary metal-oxide-semiconductor (CMOS) storage section 110. The BIOS settings are stored in the CMOS storage section 110. That is, the BIOS chip 106 and the CMOS storage section 110 are included in the storage unit 102. In addition to the BIOS chip 106 and the southbridge chip 108, the mother board 100 further includes a central processing unit (CPU) 112 and a northbridge chip 114. The CPU 112 read the BIOS software and BIOS settings from the BIOS chip 106 and the southbridge chip 108 through the northbridge chip 114 when the computer 10 starts.

The computer 10 also includes a power supply unit 900. The power supply unit 900 is configured for connecting to the external power source and converting the voltage of the external power source into various working voltages for the computer 10, including the standby voltage $V_{STB}$. That is, the standby power source 800 is a part of the power supply 900. The mother board 100 includes a standby power socket 104. The standby power source 800 is connected to the standby power socket 104 via cables to provide the standby voltage $V_{STB}$ for the controller 400, the BIOS display 200, and the BIOS input unit 300.

The BIOS display 200 can include a liquid crystal display (LCD) panel. The BIOS input unit 300 can includes a number of keys, for example, a navigation key 302, an OK key 304, and a CANCEL key 306. The navigation key 302 is configured for select options of the BIOS settings. The OK key 304 and the CANCEL key 306 are configured for confirming or canceling an operation of the BIOS settings, for example, a selection of an option of the BIOS settings. The BIOS display 200 and the BIOS input unit 300 also can be integrated into a touch panel in other embodiments, though in this embodiment the BIOS display 200 and the BIOS input unit 300 are separated from each other.

The controller 400 can be a single-chip, which can be programmed to read the BIOS software and the BIOS settings from the storage unit 102, drive the BIOS display 200 to display the BIOS UI based upon the BIOS software and the BIOS settings, and edit the BIOS settings based upon the user inputs by the BIOS input unit 300. In other embodiments, the controller 400 can be configured only for reading the BIOS software and BIOS settings and rendering the BIOS UI on the BIOS display 200 to provide a basis of determination of whether or not BIOS setting is required.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A computer, comprising:
a mother board comprising a storage unit, the storage unit storing BIOS software and BIOS settings of the computer;
a standby power source;
a BIOS display;
a BIOS input unit; and
a controller;
wherein the BIOS display, the BIOS input unit, and the controller are connected to the standby power source, the standby power source is configured for providing a standby voltage that activates the BIOS display, the BIOS input unit, and the controller all the time after the computer is powered, even before the computer is started up, such that the controller reads the BIOS software and the BIOS settings from the storage unit, drives the BIOS display to display a BIOS UI based upon the BIOS software and the BIOS setting, and edits the BIOS settings based upon inputs from the BIOS input unit.

2. The computer of claim 1, further comprising a housing, the mother board and the controller being received in the housing, the BIOS display and the BIOS input unit being mounted on the housing.

3. The computer of claim 2, wherein the housing comprises a front panel, and the BIOS display and the BIOS input unit are mounted on the front panel.

4. The computer of claim 1, wherein the storage unit comprises a BIOS chip, and the BIOS software is storage in the BIOS chip.

5. The computer of claim 1, wherein the mother board comprises a southbridge, the storage unit comprises a CMOS storage section, the CMOS storage section is integrated into the southbridge chip, and the BIOS settings are stored in the CMOS storage section.

6. The computer of claim 1, wherein the BIOS input unit comprises a navigation key, an OK key, and a CANCEL key, the navigation key is configured for select options of the BIOS settings, and the OK key is configured for confirming an operation of the BIOS settings, the CANCEL key is configured for cancelling an operation of the BIOS settings.

7. The computer of claim 1, wherein the BIOS display and the BIOS input unit are integrated into a touch panel.

8. The computer of claim 1, wherein the controller comprises a single-chip.

9. The computer of claim 1, further comprising a power supply unit configured for connecting to an external power source, wherein the power supply unit comprises the standby power source and is configured for converting the voltage of the external power source into the standby voltage.

10. The computer of claim 1, wherein the mother board comprises a standby power socket, and the standby power source is connected to the standby power socket via cables.

11. A computer comprising:
a mother board storing BIOS software and BIOS settings of the computer;
a standby power source;
a BIOS display; and
a controller;
wherein the BIOS display and the controller are connected to the standby power source, and the standby power source is configured for providing a standby voltage that activates the BIOS display and the controller, all the time after the computer is powered even before the computer is started up, such that the controller reads the BIOS software and the BIOS setting and renders a BIOS UI on the BIOS display.

12. A computer system, comprising:
a computer configured for receiving, storing, processing, and sending information after started up, the computer comprising:
a mother board storing BIOS software and BIOS settings of the computer;
a standby power source;
a BIOS display; and
a controller;
wherein the BIOS display and the controller are connected to the standby power source, and the standby power source is configured for providing a standby voltage that activates the BIOS display and the controller, all the time after the computer is powered even before the computer is started up, such that the controller reads the BIOS software and the BIOS setting and renders a BIOS UI on the BIOS display;
a display device configured displaying information from the computer after the computer is started up; and
a keyboard configured for inputting information to the computer after the computer is started up.

* * * * *